United States Patent
Hishikawa et al.

(10) Patent No.: US 12,504,748 B2
(45) Date of Patent: Dec. 23, 2025

(54) ARITHMETIC DEVICE, ARITHMETIC METHOD, AND COMPUTER-READABLE STORAGE MEDIUM

(71) Applicant: MITSUBISHI HEAVY INDUSTRIES, LTD., Tokyo (JP)

(72) Inventors: Ryogo Hishikawa, Tokyo (JP); Toshifumi Kanno, Tokyo (JP); Ryutaro Fujisawa, Tokyo (JP); Shuji Tanigawa, Tokyo (JP); Masayuki Ota, Tokyo (JP); Shintaro Kimura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 408 days.

(21) Appl. No.: 18/107,387

(22) Filed: Feb. 8, 2023

(65) Prior Publication Data
US 2023/0266750 A1  Aug. 24, 2023

(30) Foreign Application Priority Data
Feb. 22, 2022  (JP) .............................. 2022-025715

(51) Int. Cl.
*G05B 19/418*  (2006.01)

(52) U.S. Cl.
CPC ............ *G05B 19/41875* (2013.01); *G05B 2219/32339* (2013.01)

(58) Field of Classification Search
CPC ............. G05B 19/41875; G05B 2219/32339
USPC ............................................. 700/110
See application file for complete search history.

(56) References Cited

U.S. PATENT DOCUMENTS

| | | | |
|---|---|---|---|
| 2018/0095450 A1* | 4/2018 | Lappas | B33Y 10/00 |
| 2019/0143607 A1* | 5/2019 | Ogawa | G06F 30/00 374/55 |
| 2020/0156322 A1* | 5/2020 | Yorozu | B33Y 50/02 |
| 2020/0166909 A1* | 5/2020 | Noone | G06N 20/00 |

(Continued)

FOREIGN PATENT DOCUMENTS

| | | | |
|---|---|---|---|
| JP | 2017-77671 A | 4/2017 |
| JP | 2020-1302 A | 1/2020 |

(Continued)

*Primary Examiner* — Md Azad
(74) *Attorney, Agent, or Firm* — Birch, Stewart, Kolasch & Birch, LLP

(57) ABSTRACT

An arithmetic device includes a deformation amount acquisition unit that acquires an actual measurement deformation amount of a fabrication object that is manufactured based on a target shape, the actual measurement deformation amount corresponding to a deviation amount of a shape of the fabrication object from the target shape, an analysis unit that performs an analysis, based on the target shape of the fabrication object and a reference inherent strain value corresponding to a reference value of an inherent strain of the fabrication object, and acquires an analytical deformation amount corresponding to a deviation amount of the shape of the fabrication object in the analysis from the target shape, and a strain calculation unit that calculates an estimated inherent strain value corresponding to an estimated value of the inherent strain of the fabrication object with the target shape, based on the actual measurement deformation amount and the analytical deformation amount.

9 Claims, 5 Drawing Sheets

(56) References Cited

U.S. PATENT DOCUMENTS

2021/0039321 A1* 2/2021 Yorozu ................. B29C 64/393
2021/0229182 A1* 7/2021 Yamasaki ............... B22F 10/85

FOREIGN PATENT DOCUMENTS

| JP | 2020-27491 A | 2/2020 |
| WO | WO 2018/123858 A1 | 7/2018 |
| WO | WO 2020/003899 A1 | 1/2020 |

* cited by examiner

ARITHMETIC DEVICE, ARITHMETIC METHOD, AND COMPUTER-READABLE STORAGE MEDIUM

CROSS-REFERENCE TO RELATED APPLICATIONS

The present application claims priority to and incorporates by reference the entire contents of Japanese Patent Application No. 2022-025715 filed in Japan on Feb. 22, 2022.

FIELD

The present disclosure relates to an arithmetic device, an arithmetic method, and a computer-readable storage medium.

BACKGROUND

There are known methods for designing fabrication objects that satisfy desired conditions through simulation. For example, according to Patent Literature 1, fabricating conditions to make warpage deformation and residual stress less than or equal to target values are searched by simulation. Patent Literature 1 also describes the use of thermo-elastic-plastic analysis and an inherent strain method. In the inherent strain method, predicted values of an inherent strain can be calculated based on the amount of elastic strain.

CITATION LIST

Patent Literature

Patent Literature 1: Japanese Patent Application Laid-open No. 2017-77671

SUMMARY

Technical Problem

It is difficult to measure the inherent strain directly. In addition, it is difficult to estimate the inherent strain with high accuracy because it is a value with a distribution depending on the material, the shape, and the like of a fabrication object. Therefore, it has been demanded to estimate the inherent strain with high accuracy.

The present disclosure has been made in order to solve the aforementioned problem and it is an object to provide an arithmetic device, an arithmetic method, and a computer-readable storage medium that can estimate an inherent strain with high accuracy.

Solution to Problem

An arithmetic device according to the present disclosure includes: a deformation amount acquisition unit that acquires an actual measurement deformation amount of a fabrication object that is manufactured based on a target shape, the actual measurement deformation amount corresponding to a deviation amount of a shape of the fabrication object from the target shape; an analysis unit that performs an analysis, based on the target shape of the fabrication object and a reference inherent strain value corresponding to a reference value of an inherent strain of the fabrication object, and acquires an analytical deformation amount corresponding to a deviation amount of the shape of the fabrication object in the analysis from the target shape; and a strain calculation unit that calculates an estimated inherent strain value corresponding to an estimated value of the inherent strain of the fabrication object with the target shape, based on the actual measurement deformation amount and the analytical deformation amount.

An arithmetic method according to the present disclosure includes: acquiring an actual measurement deformation amount of a fabrication object that is manufactured based on a target shape, the actual measurement deformation amount corresponding to a deviation amount of a shape of the fabrication object from the target shape; performing an analysis, based on the target shape of the fabrication object and a reference inherent strain value corresponding to a reference value of an inherent strain of the fabrication object, to acquire an analytical deformation amount corresponding to a deviation amount of the shape of the fabrication object in the analysis from the target shape; and calculating an estimated inherent strain value corresponding to an estimated value of the inherent strain of the fabrication object with the target shape, based on the actual measurement deformation amount and the analytical deformation amount.

A non-transitory computer-readable storage medium according to the present disclosure stores a computer program for causing a computer to execute: acquiring an actual measurement deformation amount of a fabrication object that is manufactured based on a target shape, the actual measurement deformation amount corresponding to a deviation amount of a shape of the fabrication object from the target shape; performing an analysis, based on the target shape of the fabrication object and a reference inherent strain value corresponding to a reference value of an inherent strain of the fabrication object, to acquire an analytical deformation amount corresponding to a deviation amount of the shape of the fabrication object in the analysis from the target shape; and calculating an estimated inherent strain value corresponding to an estimated value of the inherent strain of the fabrication object with the target shape, based on the actual measurement deformation amount and the analytical deformation amount.

Advantageous Effects of Invention

According to the present disclosure, an inherent strain can be estimated with high accuracy.

DESCRIPTION OF EMBODIMENTS

Preferred embodiments of the present disclosure are described in detail below with reference to the accompanying drawings. The present disclosure is not limited by this embodiment, and if there is more than one embodiment, the combination of the embodiments is also included.

First Embodiment

Fabrication System

Figure 1:
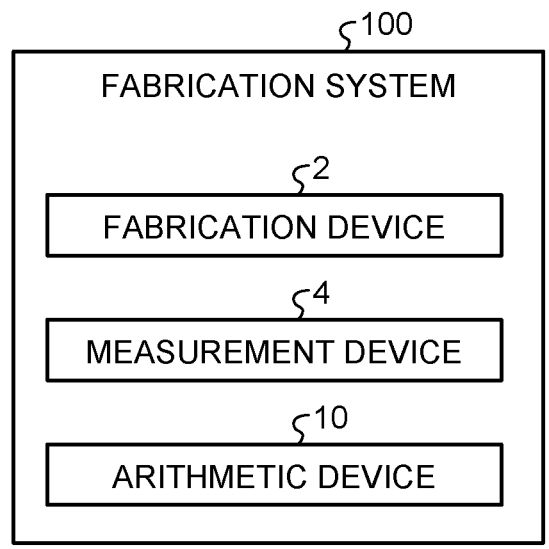
FIG. 1 is a schematic block diagram of a fabrication system according to a first embodiment.
Figure 2:
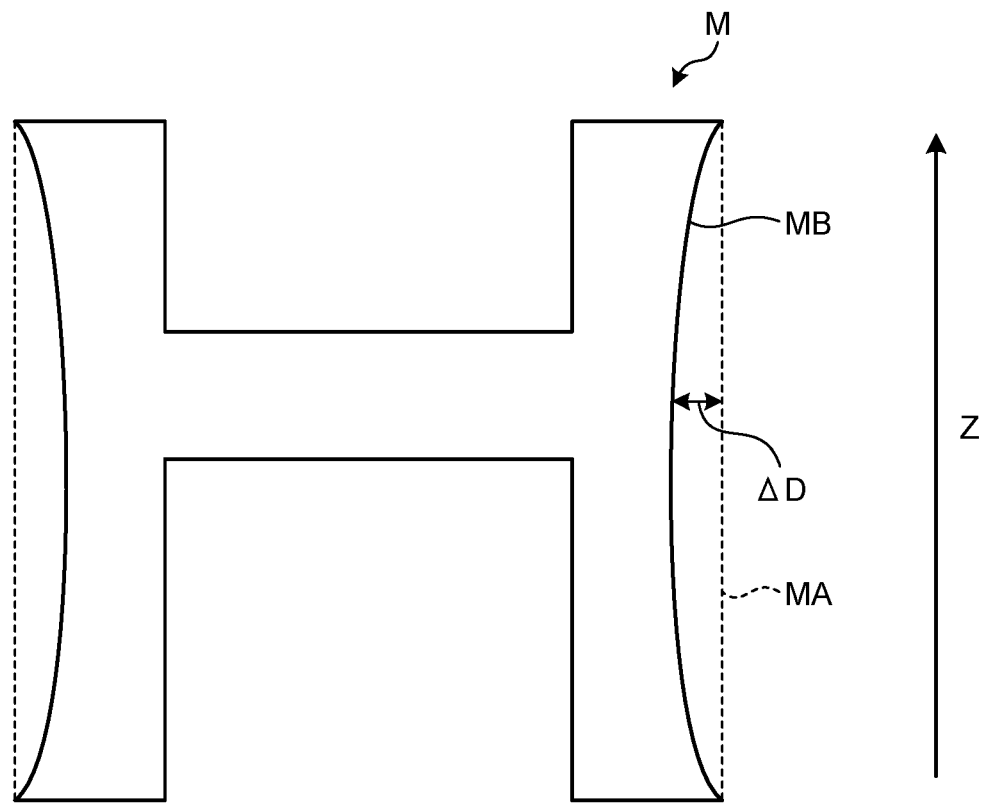
FIG. 2 is a schematic diagram illustrating an example of a fabrication object.

FIG. 1 is a schematic block diagram of a fabrication system according to a first embodiment, and FIG. 2 is a schematic diagram illustrating an example of a fabrication object. A fabrication system 100 according to the first embodiment includes a fabrication device 2, a measurement device 4, and an arithmetic device 10.

Fabrication Device

The fabrication device 2 is a device that fabricates a fabrication object M. The fabrication object M is a member with a predetermined three-dimensional shape, but may have any material and shape. The fabrication device 2 may manufacture the fabrication object M by any method, and in this embodiment, the fabrication device 2 is a three-dimensional stacking device that fabricates the fabrication object M by three-dimensional stacking. In other words, the fabrication device 2 manufactures the fabrication object M with a desired three-dimensional shape by stacking a plurality of layers. Any method may be used for three-dimensional stacking by the fabrication device 2. For example, the fabrication object M may be fabricated in a manner that a bed filled with powder is irradiated with light such as a laser beam so that the irradiated portion is hardened to form a layer, the bed is moved in a stacking direction, and then the similar process is repeated. In another example, the fabrication device 2 may fabricate the fabrication object M by repeating a process of jetting powder, melting and dripping the powder by irradiating the powder with a laser beam or other light, hardening the dripped melt to form a layer, and further dripping and hardening the melt on top of that layer. The fabrication object M may be any material and shape. In the description below, the direction in which the respective layers are stacked, i.e., the stacking direction, is referred to as a Z direction.

The fabrication device 2 fabricates the fabrication object M so that the fabrication object M has a target shape (design value of shape), which is a shape targeted by the fabrication object M. In other words, the fabrication device 2 fabricates the fabrication object M by stacking the respective layers to achieve the target shape, based on the information of a model of the fabrication object that indicates the target shape. Although the fabrication object M fabricated by the fabrication device 2 is fabricated so as to have the target shape, the shape may deviate from the target shape due to deformation caused by, for example, thermal contraction or the like. In other words, in the example in FIG. 2, the target shape of the fabrication object M is MA and the actual shape of the manufactured fabrication object M is MB, and the shape MB may deviate from the target shape MA.

Measurement Device

The measurement device 4 is a device that measures the shape of the manufactured fabrication object M, i.e., the shape MB. The measurement device 4 may measure any position on the manufactured fabrication object M. In this embodiment, the measurement device 4 measures the shape of the surface of the fabrication object M. The measurement device 4 may measure the entire surface of the fabrication object M or the surface of a part of the entire surface. When measuring a part of the entire surface of the fabrication object M, the measurement device 4 more preferably measures the shape of one surface of the fabrication object M ranging from an end point (bottom) on the opposite side of the Z direction to an end point (tip) on the Z direction side. If the fabrication object M is not formed of one continuous member but formed of a plurality of members separated from each other, the measurement device 4 preferably measures the shape of the surface for each of those members.

The measurement device 4 calculates, as an actual measurement deformation amount, the amount of deviation of the measured shape of the fabrication object M relative to the target shape MA. The actual measurement deformation amount can be said to be the amount of deviation of the actual shape of the surface of the fabrication object M relative to the target shape MA (difference ΔD in FIG. 2). The measurement device 4 calculates the actual measurement deformation amount for each position on the surface of the fabrication object M whose shape is measured. In other words, in the example in this embodiment, the measurement device 4 calculates the actual measurement deformation amount for each position from the end point of the surface of the fabrication object M on the opposite side of the Z direction to the end point on the Z direction side.

Arithmetic Device

The arithmetic device 10 is a device that calculates an estimated inherent strain value, which is an estimated value of the inherent strain of the fabrication object M. In this embodiment, the arithmetic device 10 corrects the target shape MA on the basis of the actual measurement deformation amount and the estimated inherent strain value. As described in detail below, the arithmetic device 10 sets a correction target shape, which is a corrected target shape, in accordance with the actual measurement deformation amount and the estimated inherent strain value so that the deformed fabrication object M approaches the initial target shape MA. In other words, the design value of the shape (correction target shape) is shifted on purpose from the desired shape (initial target shape MA) in consideration of the deformation of the manufactured fabrication object M. This allows the manufactured fabrication object M to approach the desired shape. The arithmetic device 10 is hereinafter described specifically.

Figure 3:
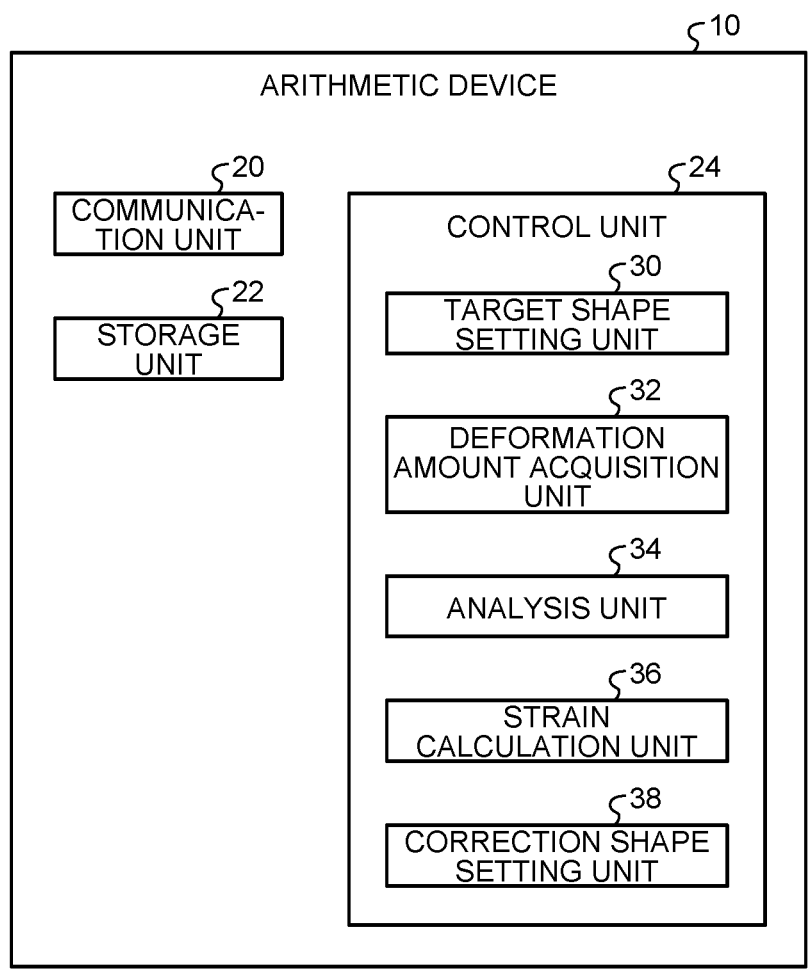
FIG. 3 is a schematic block diagram of an arithmetic device according to an embodiment.

FIG. 3 is a schematic block diagram of the arithmetic device according to the present embodiment. The arithmetic device 10 is a computer, for example, and includes a communication unit 20, a storage unit 22, and a control unit 24 as illustrated in FIG. 3. The communication unit 20 is a communication module that communicates with external devices such as the fabrication device 2 and the measurement device 4, and may be, for example, an antenna or a Wi-Fi (registered trademark) module. The arithmetic device 10 communicates with the external device via wireless communication, but wired communication is also acceptable. Any method may be used for the communication. The storage unit 22 is a memory that stores the arithmetic content of the control unit 24 and information about computer programs therein, and includes, for example, at least one of a main storage device such as a random access memory (RAM) or a read only memory (ROM) and a nonvolatile storage device such as a flash memory or a hard disk drive (HDD). The computer program for the control unit 24 to be saved in the storage unit 22 may be stored in a (non-transitory) computer-readable storage medium that can be read by the arithmetic device 10 which may be a computer.

The control unit 24 is an arithmetic device and includes an arithmetic circuit such as a central processing unit (CPU). The control unit 24 includes a target shape setting unit 30, a deformation amount acquisition unit 32, an analysis unit 34, a strain calculation unit 36, and a correction shape setting unit 38. The control unit 24 reads out a computer program (software) from the storage unit 22 and executes the computer program to achieve the target shape setting unit 30, the deformation amount acquisition unit 32, the analysis unit 34, the strain calculation unit 36, and the correction shape setting unit 38, and executes their processes. The control unit 24 may execute these processes by a single CPU, or may be equipped with multiple CPUs and execute the processes with those multiple CPUs. At least a part of the processes of the target shape setting unit 30, the deformation amount acquisition unit 32, the analysis unit 34, the strain calculation unit 36, and the correction shape setting unit 38 may be achieved by a hardware circuit.

Target Shape Setting Unit

The target shape setting unit 30 sets the target shape MA of the fabrication object M. The target shape setting unit 30 first sets the initial target shape MA, i.e., the desired shape. Any method may be used for setting the target shape MA. For example, the target shape MA may be set by the user or automatically set by the target shape setting unit 30. The target shape setting unit 30 also corrects the initial target shape MA on the basis of the estimated inherent strain value to set the correction target shape. Setting the correction target shape is described below.

Deformation Amount Acquisition Unit

The deformation amount acquisition unit 32 acquires the actual measurement deformation amount of the fabrication object M. In this embodiment, the deformation amount acquisition unit 32 acquires the actual measurement deformation amount calculated by the measurement device 4 from the measurement device 4 through the communication unit 20. However, any method may be used for acquiring the actual measurement deformation amount by the deformation amount acquisition unit 32. For example, the deformation amount acquisition unit 32 may calculate the actual measurement deformation amount. In this case, the deformation amount acquisition unit 32 may acquire the shape of the fabrication object M measured by the measurement device 4 and the target shape MA, and calculate the difference between the measured shape of the fabrication object M and the target shape MA as the actual measurement deformation amount.

Analysis Unit

Based on the target shape MA and a reference inherent strain value, the analysis unit 34 performs an analysis of the fabrication object M to acquire the analytical deformation amount, which is the amount of deviation of the shape of the fabrication object M from the target shape MA in the analysis. The analytical deformation amount refers to the amount of deformation from the target shape MA at the position in the model of the fabrication object M that overlaps the position where the actual measurement deformation amount of the fabrication object M was measured. The analysis unit 34 sets the inherent strain value of the fabrication object M in the analysis on the basis of the reference inherent strain value, and calculates the analytical deformation amount of the model of the fabrication object M that will have the target shape MA using the set inherent strain value as input data in the analysis. The analysis performed by the analysis unit 34 is based on a finite element method using the inherent strain method. The analysis unit 34 calculates the analytical deformation amount by applying the reference inherent strain value to the model of the fabrication object M with the target shape MA in the analysis and simulating the deformation of the fabrication object M. The reference inherent strain value refers to the inherent strain value that serves as a reference for the inherent strain value of the fabrication object M in the analysis. The reference inherent strain value may be any set value, and for example, a value set in advance based on the material of the fabrication object M, etc., regardless of the shape of the fabrication object M may be used.

Figure 4:
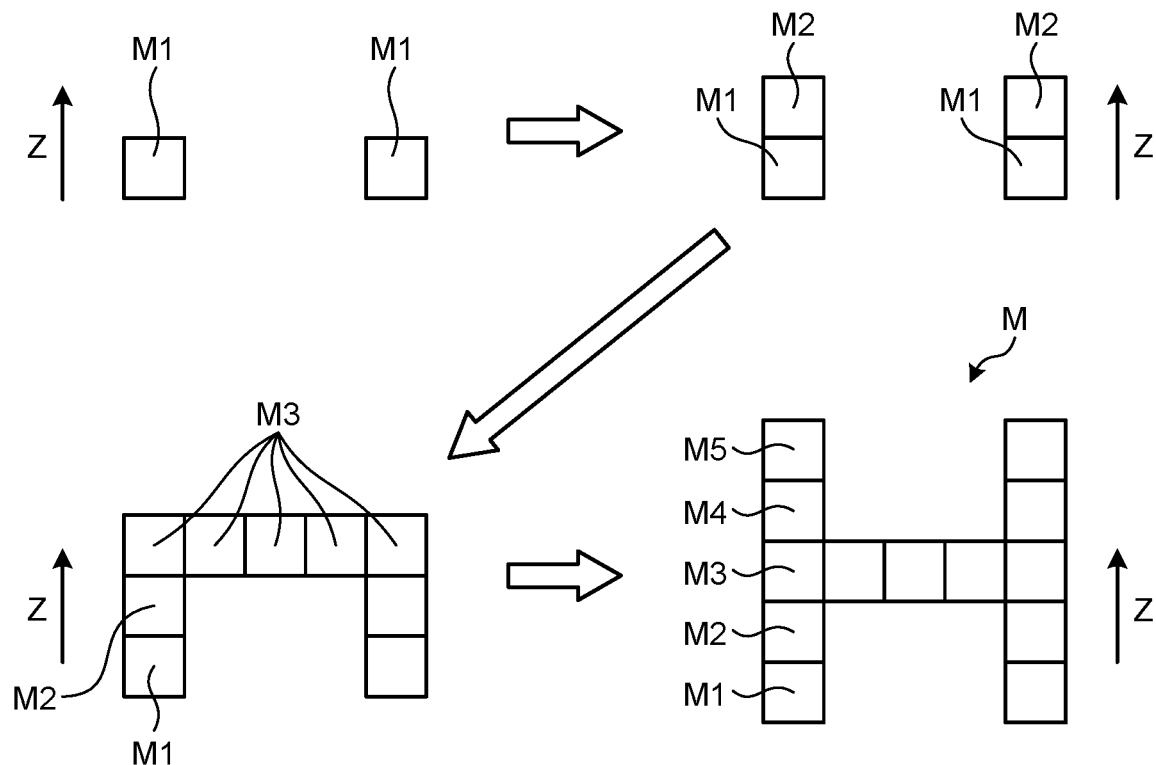
FIG. 4 is a schematic diagram illustrating an example of an analysis by an analysis unit.

FIG. 4 is a schematic diagram illustrating an example of the analysis by the analysis unit. The analysis unit 34 calculates the analytical deformation amount for each position of the fabrication object M. In this embodiment, the analysis unit 34 preferably uses a so-called layer-by-layer analysis method, in which a model of the fabrication object M is stacked layer by layer for the analysis. In this case, the analysis unit 34 sets the inherent strain values in the analysis on a layer-by-layer (position-by-position) basis in accordance with the reference inherent strain value. The analysis unit 34 may keep the reference inherent strain value constant in one layer, or may have a distribution of reference strain values in one layer so that the reference strain value in one layer varies from position to position. The analysis unit 34 performs sequential analysis while stacking layers in the model of the fabrication object M. In this manner, the analysis unit 34 calculates, as the analytical deformation amount, the amount of deviation of the model shape from the target shape for each stacking until the target shape MA is achieved. In the example in FIG. 4, the analysis is performed with layers M1, M2, M3, M4, and M5 stacked in this order. In this case, the analysis unit 34 calculates the analytical deformation amount in the layer M1 by performing an analysis on the basis of the reference inherent strain value set for the layer M1 on the model of the fabrication object M in which the layer M1 is stacked. Next, the analysis unit 34 calculates the analytical deformation amount in the layer M1 and the layer M2 by performing an analysis on the basis of the reference inherent strain value set for the layer M2 on the model of the fabrication object M in which the layer M2 on the Z direction side of the layer M1 is stacked. Thereafter, the analysis is repeated in the similar manner, and the analysis unit 34 calculates the analytical deformation amount in the layers M1 to M5 by performing an analysis on the basis of the reference inherent strain value set for the layer M5 on the model of the fabrication object M in which the last layer M5 is stacked on the layers M1 to M4, and thus obtains the analytical deformation amount of the fabrication object M. The analysis unit 34 uses the common reference inherent strain value as the inherent strain value for each layer in the analysis, so that the inherent strain value in the analysis is the same for each layer. However, the value is not limited to this, and the analysis unit 34 may use a different reference inherent strain value for each layer, thereby varying the inherent strain value in the analysis for each layer. The layers in the analysis may or may not be the same as the layers in the actual manufacturing process. To shorten the analysis time, multiple layers in the manufacturing process may be combined into one layer in the analysis.

Strain Calculation Unit

The strain calculation unit 36 calculates the estimated inherent strain value on the basis of the actual measurement deformation amount acquired by the deformation amount acquisition unit 32 and the analytical deformation amount acquired by the analysis unit 34. The strain calculation unit 36 calculates the estimated inherent strain value for each position (for each layer in this example). The estimated inherent strain value is the estimated value of the inherent strain of the fabrication object M with the target shape MA. That is to say, it is difficult to measure the actual inherent strain value from the fabrication object M but, in the present embodiment, it is regarded that the inherent strain value and the deformation amount have correlation (for example, linear relation) and by applying the correspondence between the analytical deformation amount and the reference inherent strain amount in the analysis to the actual measurement deformation amount and calculating the estimated inherent strain value from the actual measurement deformation amount, the inherent strain value can be calculated with high accuracy. More specific description is made below.

Figure 5:
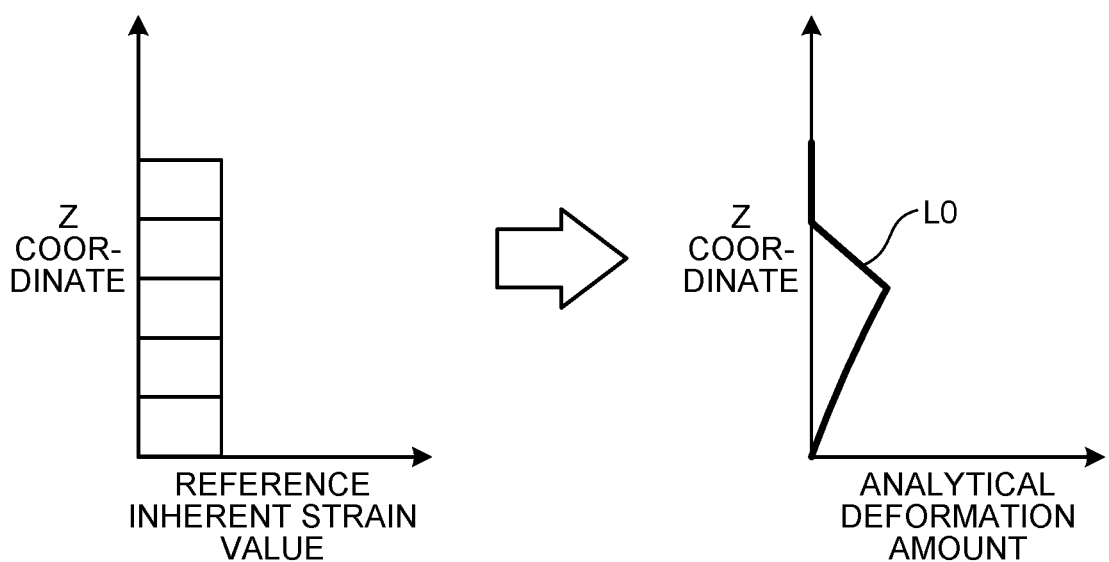
FIG. 5 is a schematic diagram for describing a process of a strain calculation unit.
Figure 6:
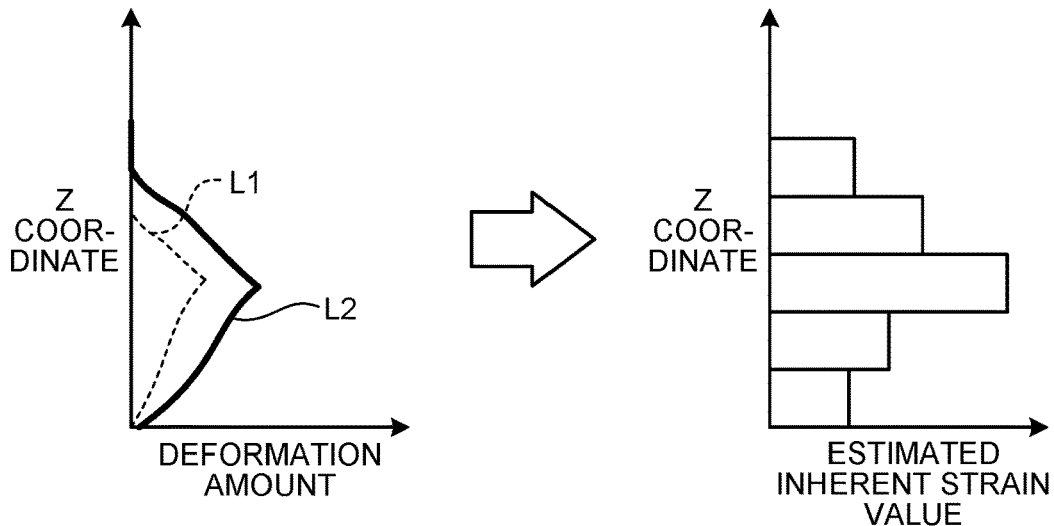
FIG. 6 is a schematic diagram for describing the process of the strain calculation unit.

FIG. 5 and FIG. 6 are schematic diagrams for describing the process of the strain calculation unit. In FIG. 5, the horizontal axis of the graph on the left side represents the reference inherent strain value, and the vertical axis represents the position (Z coordinate) in the Z direction (stacking direction) of the model of the fabrication object M. That is, the graph on the left side in FIG. 5 expresses an example of the reference inherent strain values at the respective positions in the Z direction. In the graph on the right side in FIG. 5, the horizontal axis represents the analytical deformation amount, and the vertical axis represents the Z coordinate of the model of the fabrication object M. That is, a line L0 in the graph on the right side in FIG. 5 expresses an example of the analytical deformation amounts for the respective positions in the Z direction. The strain calculation unit 36 calculates a correspondence H (response matrix) between the inherent strain and the analytical deformation amount on the basis of the reference inherent strain value and the analytical deformation amount. The strain calculation unit 36 calculates the correspondence H for each position of the model of the fabrication object M (in this example, for each position in the Z direction). For example, the strain calculation unit 36 calculates the correspondence H on the basis of the following Expression (1).

$$\begin{Bmatrix} u_1 \\ u_2 \\ \vdots \\ u_n \end{Bmatrix} = [H] \begin{Bmatrix} A_1 \\ A_2 \\ \vdots \\ A_m \end{Bmatrix} \quad (1)$$

In Expression (1), $u_1, u_2, \ldots u_n$ refer to the analytical deformation amounts at the respective positions, and $A_1, A_2, \ldots A_m$ refer to the reference inherent strain values at the respective positions.

The strain calculation unit 36 calculates the estimated inherent strain value on the basis of the correspondence H and the actual measurement deformation amount acquired by the deformation amount acquisition unit 32. Specifically, the strain calculation unit 36 calculates the estimated inherent strain value so that the difference between the deformation amount of the fabrication object M calculated backward from the estimated inherent strain value (estimated deformation amount) and the analytical deformation amount becomes a predetermined value or less. In the example in FIG. 6, it can be said that the estimated inherent strain value is calculated so that the difference between a line L1 indicating the deformation amount of the fabrication object M calculated backward from the estimated inherent strain value and a line L2 indicating the analytical deformation amount becomes the predetermined value or less. More specifically, the strain calculation unit 36 repeats a process of calculating (calculating backward) the estimated deformation amount of the fabrication object M using the correspondence H on the basis of the estimated inherent strain value to be the candidate, and calculating the difference between the estimated deformation amount calculated backward and the measurement deformation amount, for each estimated inherent strain value to be the candidate, and treats the estimated inherent strain value to be the candidate whose difference becomes the predetermined value or less, as the estimated inherent strain value. For example, the estimated deformation amount calculated backward from the estimated inherent strain value is calculated as $u_1, u_2, \ldots u_n$ by the input of the estimated inherent strain values to be the candidates in $A_1, A_2, \ldots A_n$ in Expression (1). In another example, the estimated deformation amount calculated backward from the estimated inherent strain value may be calculated by causing the analysis unit 34 to perform an analysis using the estimated inherent strain value as the inherent strain of the model.

For example, the strain calculation unit 36 may calculate the estimated inherent strain value by performing optimization calculations to solve a minimization problem such that the difference between the estimated deformation amount calculated backward from the estimated inherent strain value and the actual measurement deformation amount is minimized. In other words, the estimated inherent strain value may be calculated so that, when $X_1$ is the value expressed in Expression (2), Expression (3) is satisfied, or Expression (4) is satisfied. However, the calculation method for the inherent strain values is not limited to this method and any method may be used.

$$X_1 = (\{A\}^T [H]^T - \{u\}^T)([H]\{A\} - \{u\}) \quad (2)$$

$$\frac{\partial X_1}{\partial \{A\}} = 0 \quad (3)$$

$$\{A\} = ([H]^T [H])^{-1} [H]^T \{u\} \quad (4)$$

In Expressions (2) to (4), A refers to the estimated inherent strain value, u refers to the actual measurement deformation amount, and T refers to the transposition.

Correction of Target Shape

The correction shape setting unit 38 corrects the initial target shape MA using the estimated inherent strain values calculated in this way, thereby setting the correction target shape. Specifically, in a case where the model of the fabrication object M with the correction target shape is deformed by the estimated deformation amount calculated backward from the estimated inherent strain value, the correction shape setting unit 38 sets the correction target shape so as to fall within a predetermined range of deviation amount relative to the initial target shape MA (preferably, to be the same shape as the target shape MA). The correction shape setting unit 38 transmits the information on the correction target shape to the fabrication device 2. The fabrication device 2 manufactures the fabrication object M so that the fabrication object M has the correction target shape, i.e., by using the correction target shape as a new design value. In this embodiment, the actual measurement deformation amount, which is the amount of deviation from the initial target shape MA, may also be measured regarding the fabrication object M that has been fabricated to have the correction target shape. If the actual measurement deformation amount is higher than the predetermined value, the correction target shape may be further corrected. In other words, the correction target shape may be optimized until the actual measurement deformation amount becomes the predetermined value or less.

Procedure

Figure 7:
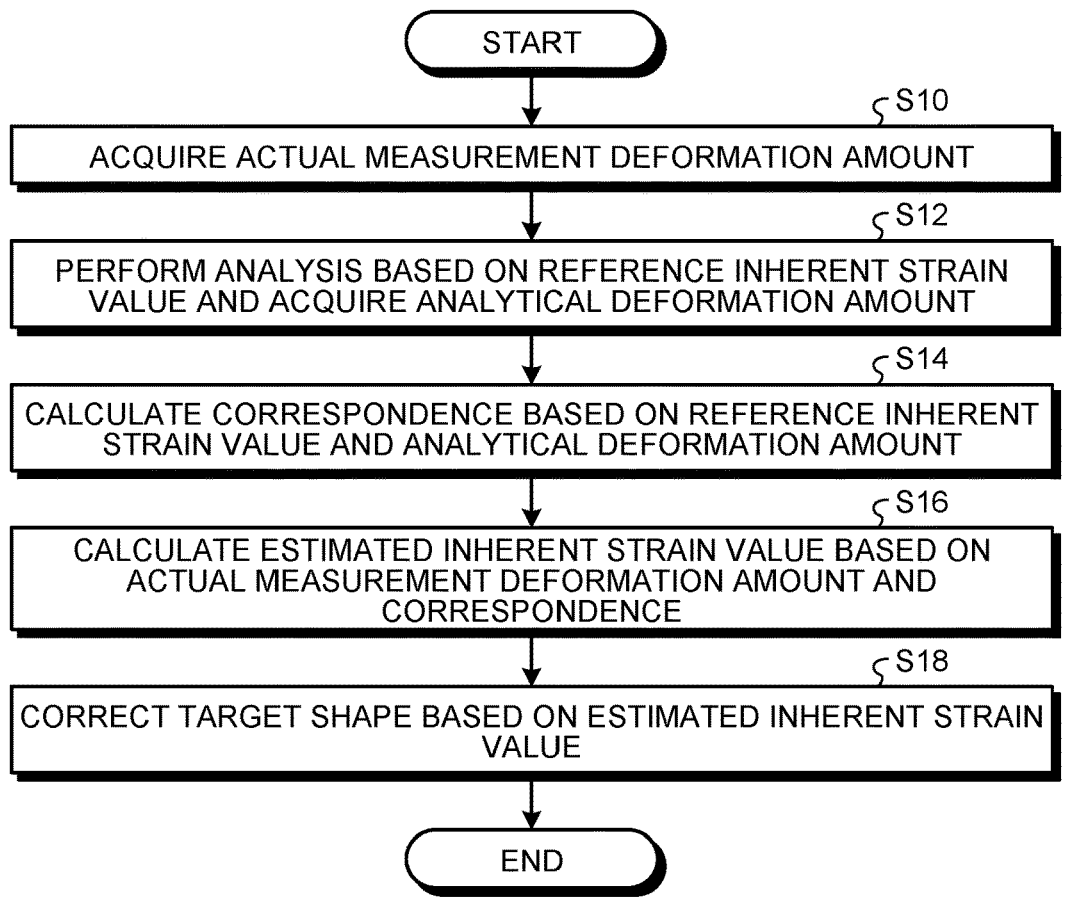
FIG. 7 is a flowchart for describing a procedure of the arithmetic device.

A procedure of the arithmetic device 10 according to the present embodiment is hereinafter described. FIG. 7 is a flowchart for describing the procedure of the arithmetic device. As illustrated in FIG. 7, the arithmetic device 10 causes the deformation amount acquisition unit 32 to acquire the actual measurement deformation amount of the fabrication object M (step S10). Then, the arithmetic device 10 causes the analysis unit 34 to execute an analysis of the model of the fabrication object M on the basis of the reference inherent strain value and acquires the analytical deformation amount (step S12). Then, the arithmetic device 10 causes the strain calculation unit 36 to calculate the correspondence H between the inherent strain and the analytical deformation amount on the basis of the reference inherent strain value and the analytical deformation amount (step S14), and calculate the estimated inherent strain value on the basis of the actual measurement deformation amount and the correspondence H (step S16). The strain calculation unit 36 may calculate the optimized estimated inherent strain value by repeating the operations until the difference between the deformation amount calculated backward based on the estimated inherent strain value, and the actual measurement deformation amount becomes within the predetermined value. Step S10 and steps S12 and S14 described below may be performed in any order of processing. The arithmetic device 10 then causes the correction shape setting unit 38 to correct the target shape MA on the basis of the estimated inherent strain values, thereby setting the correction target shape (step S18).

Advantageous Effects

Here, it is difficult to measure the inherent strain directly and the inherent strain has the value depending on the material, shape, and the like of the fabrication object, and thus, it is difficult to predict the inherent strain with high accuracy. In contrast to this, the arithmetic device 10 according to the present embodiment estimates the inherent strain value on the basis of the analytical deformation amount analyzed based on the temporal inherent strain value (reference inherent strain value) and the actual measurement deformation amount corresponding to the actual measurement value of the deformation amount; therefore, the inherent strain can be predicted with high accuracy.

Second Embodiment

Next, a second embodiment is described. In the second embodiment, based on the difference between the analytical deformation amount when a layer is stacked and the analytical deformation amount when another layer is stacked, the estimated inherent strain value of that layer is calculated. In the second embodiment, the part with the structure common to that in the first embodiment is not described.

Figure 8:
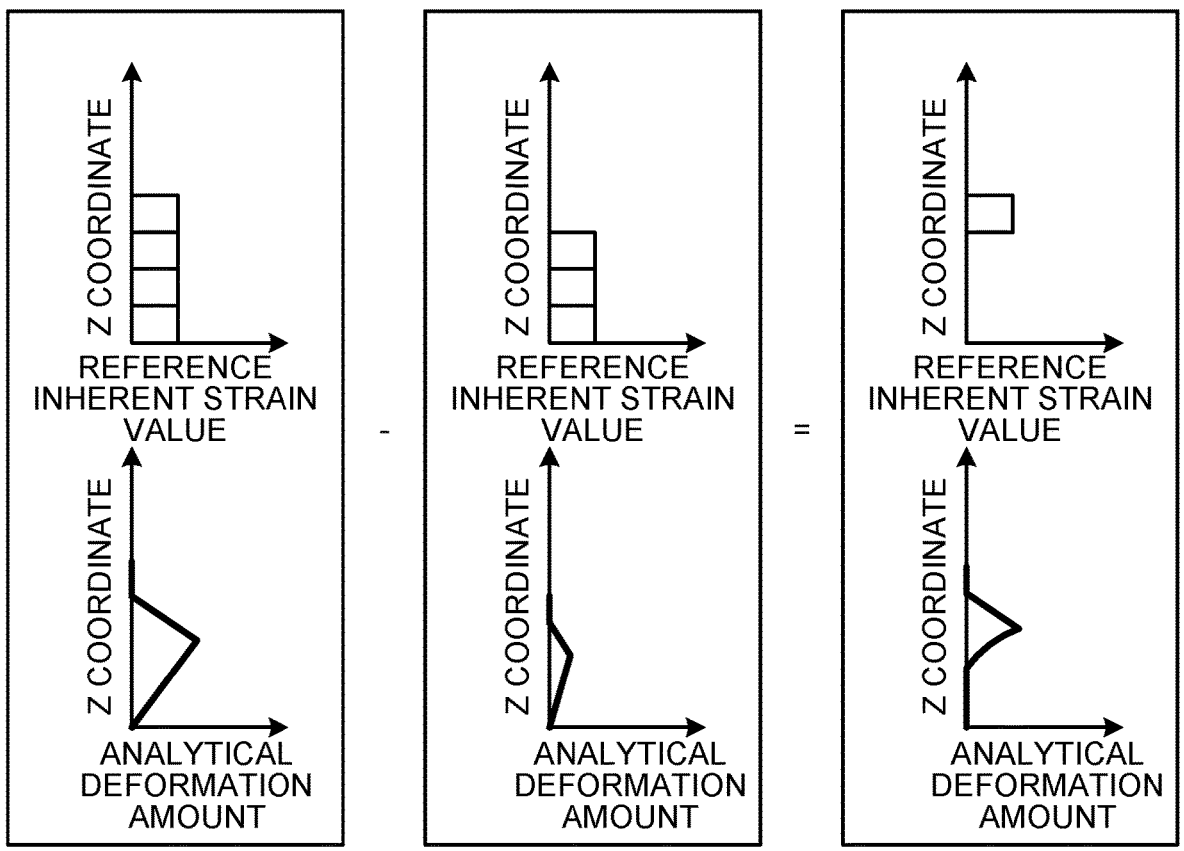
FIG. 8 is a schematic diagram for describing a calculation method for a deformation amount in a second embodiment.

FIG. 8 is a schematic diagram for describing a calculation method for the deformation amount in the second embodiment. As described above, the analysis unit 34 performs the analysis by stacking the model of the fabrication object M layer by layer, and the strain calculation unit 36 calculates the estimated inherent strain value for each layer of the model of the fabrication object M. In an example below, the estimated inherent strain value for the layer M4 is calculated. In this case, as illustrated in FIG. 8, the strain calculation unit 36 calculates the difference in each layer between the analytical deformation amount calculated in the model of the fabrication object M in which the layer M4 is stacked and the analytical deformation amount calculated in the model of the fabrication object M in which a layer other than the layer M4 is stacked. As the model of the fabrication object M before the layer other than the layer M4 is stacked, the model of the fabrication object M before the layer M4 is stacked is preferable, and the model of the fabrication object M in which the layer M3 just before the layer M4 is stacked is more preferable. The strain calculation unit 36 treats the difference in each layer as the analytical deformation amount, and calculates the correspondence H in the layer M4 on the basis of the difference in each layer and the reference inherent strain value in each layer. The strain calculation unit 36 repeats the similar process for each layer to calculate the correspondence H for each layer. That is, if the evaluation point of the model of the fabrication object M is i (i=1 to n) and the layer number is j (j=1 to m), the correspondence $H_{ij}$ at the evaluation point i and the layer j is calculated, for example, as in the following Expression (A).

$$H_{ij} = \Delta u_{ij}/A_j \qquad (A)$$

The analytical deformation amount $\Delta u_{ij}$ in Expression (A) refers to the difference between the analytical deformation amount when the layer j is stacked and the analytical deformation amount when the layer j−1 is stacked at the evaluation point i. $A_j$ refers to the reference inherent strain value at the layer j.

The strain calculation unit 36 in the second embodiment calculates the estimated inherent strain value for each layer using the correspondence H calculated in this way, in a manner similar to the first embodiment.

Here, in a case of calculating the correspondence H or the estimated inherent strain value for each layer, for example, the layer-by-layer analysis in which the reference inherent strain value is input to only one layer and the reference inherent strain values of the other layers are zero may be performed as many times as the number of layers while varying the layer to which the reference inherent strain value is input. However, to calculate the correspondence H in this way, the analysis needs to be performed as many times as the number of layers, which increases the analysis load. In contrast to this, in the second embodiment, the strain calculation unit 36 calculates the estimated inherent strain value of the layer on the basis of the difference between the analytical deformation amount when the layer is stacked and the analytical deformation amount when another layer is stacked in the analysis. In other words, in the layer-by-layer analysis, the analysis is performed while the layers are stacked in a single analysis. In the second embodiment, by using this, the correspondence H in the target layer is calculated from the difference between the analytical deformation amount when the target layer is stacked and the analytical deformation amount when a layer other than the target layer is stacked in one analysis. This eliminates the need to run the analysis as many times as the number of layers, thereby reducing the analysis load.

When directions orthogonal to the Z direction are an X direction and a Y direction, the analysis unit 34 may perform the analysis while setting the component, except one of the components in the X direction, the Y direction, and the Z direction of the reference inherent strain value, to zero. In this case, for example, the analysis unit 34 performs an analysis in which the value is set only to the component in the X direction and zero is set in the Y direction and the Z direction, an analysis in which the value is set only to the component in the Y direction and zero is set in the X direction and the Z direction, and an analysis in which the value is set only to the component in the Z direction and zero is set in the X direction and the Y direction, and after these three analysis results are obtained, the correspondence H is calculated. This increases the number of analyses, but anisotropy in the inherent strain distribution can be taken into consideration.

Third Embodiment

Next, a third embodiment will be described. In the third embodiment, the calculation method for the estimated inherent strain values differs from that in the first embodiment. In the third embodiment, the part with the structure common to that in the first embodiment is not described. The third embodiment is also applicable to the second embodiment.

In the example in the first embodiment, the strain calculation unit 36 calculates the estimated inherent strain value by solving the minimization problem in which $X_1$ (first term) is the minimum. On the other hand, in the third embodiment, the strain calculation unit 36 calculates the estimated inherent strain value by solving the minimization problem that gives a penalty if the estimated inherent strain value is far away from a predetermined value. Specifically, the strain calculation unit 36 calculates the estimated inherent strain value so that the total value of the first term $X_1$ based on the difference between the estimated deformation amount calculated backward from the estimated inherent strain value and the analytical deformation amount and the second term $X_2$ based on the difference between the estimated inherent strain value and the predetermined value is minimized. The predetermined value may be set to any value. For example, the reference inherent strain value may be used as the predetermined value.

The second term $X_2$ may be, for example, a value expressed by the following Expression (5), and $\{A_{ref}\}$ in Expression (5) is the predetermined value. In this case, the strain calculation unit 36 calculates the estimated inherent strain value so that a value J in Expression (6) is minimized. That is to say, the strain calculation unit 36 may calculate the estimated inherent strain value so as satisfy Expression (7), in other words, Expression (8). The calculation method for the estimated inherent strain value, however, is not limited to the methods using Expression (5) to Expression (8). Note that h in Expression (6) is a weight coefficient relative to a deviation value of the inherent strain, and may be set to any value. The coefficient h is a so-called hyperparameter, and a plurality of cases may be calculated by varying the parameter and the one with the desired result may be selected.

$$X_2 = (\{A\}^T - \{A_{ref}\}^T)(\{A\} - \{A_{ref}\}) \quad (5)$$

$$J = X_1 + hX_2 \quad (6)$$

$$\frac{\partial J}{\partial \{A\}} = 0 \quad (7)$$

$$\{A\} = ([H]^T + h[1])^{-1}([H]^T\{u\} + h\{A_{ref}\}) \quad (8)$$

Here, if there are many unknown variables when the estimated inherent strain value is calculated, for example, the condition becomes worse as an inverse analysis problem, in which case the solution may not be obtained suitably. For example, a leg part of a gate type structure is bent and deformed by contraction of a lateral beam of the gate type in fact, and in the analysis, by adjusting the inherent strain of the leg part instead of the inherent strain of the lateral beam part, the deformation distribution of the leg whose shape is measured can be reproduced. That is to say, the estimated inherent strain value that deviates from the actual deformation may be calculated. In contrast to this, the strain calculation unit 36 in the third embodiment calculates the estimated inherent strain value so that the estimated inherent strain value does not deviate far from the predetermined value and the total value of the first term $X_1$ and the second term $X_2$ is minimized. Thus, the calculation of the estimated inherent strain that deviates from the actual deformation is suppressed and the inherent strain value can be calculated with high accuracy. Furthermore, by using the far deviation of the estimated inherent strain value from the predetermined value as the penalty in the calculation, the deviation from the actual deformation can be suppressed suitably.

Advantageous Effects

As described above, the arithmetic device 10 according to the present disclosure includes the deformation amount acquisition unit 32, the analysis unit 34, and the strain calculation unit 36. The deformation amount acquisition unit 32 acquires the actual measurement deformation amount of the fabrication object M that is manufactured based on the target shape MA, the actual measurement deformation amount corresponding to the deviation amount of the shape of the fabrication object M from the target shape MA. The analysis unit 34 performs an analysis, based on the target shape MA and the reference inherent strain value corresponding to the reference value of the inherent strain of the fabrication object M, and acquires the analytical deformation amount corresponding to the deviation amount of the shape of the fabrication object M in the analysis from the target shape MA. The strain calculation unit 36 calculates the estimated inherent strain value corresponding to the estimated value of the inherent strain of the fabrication object M with the target shape MA, based on the actual measurement deformation amount and the analytical deformation amount. Since the arithmetic device 10 estimates the inherent strain value from the analytical deformation amount analyzed based on the temporal inherent strain value (reference inherent strain value) and the actual measurement deformation amount corresponding to the actual measurement value of the deformation amount, the inherent strain can be predicted with high accuracy.

The analysis unit 34 calculates, as the analytical deformation amount, the deviation amount of the shape, from the target shape MA, of the model of the fabrication object M to have the target shape MA while the reference inherent strain value is used as the inherent strain. According to the present disclosure, the inherent strain can be predicted with high accuracy.

The fabrication object M is fabricated by layer stacking. The analysis unit 34 sets the inherent strain for each layer, based on the reference inherent strain value, and calculates, as the analytical deformation amount, the deviation amount of the shape from the target shape MA for each of layers stacked until the target shape MA is obtained. The strain calculation unit 36 calculates the estimated inherent strain value for each layer of the fabrication object M. According to the present disclosure, by performing the analysis with the layers stacked in this manner, the inherent strain of the fabrication object M fabricated by the layer stacking can be predicted with high accuracy. Note that, as described above, the layer in the analysis and the layer in the actual manufacture may be either the same or different.

The strain calculation unit 36 calculates the estimated inherent strain value regarding the layer of the fabrication object M, based on the difference between the analytical deformation amount when the layer is stacked and the analytical deformation amount when another layer is stacked in the analysis. The strain calculation unit 36, which calculates the estimated inherent strain value using the difference between the analytical deformation amount when the target layer is stacked and the analytical deformation amount when the layer other than the target layer is stacked, does not need to perform the analysis as many times as the number of layers and accordingly, the analysis load can be reduced.

The strain calculation unit 36 calculates the correspondence H between the deformation amount and the inherent strain of the fabrication object M, based on the analytical deformation amount and the reference inherent strain value, and calculates the estimated inherent strain value, based on the actual measurement deformation amount and the correspondence H. According to the present disclosure, the inherent strain can be predicted with high accuracy.

The strain calculation unit 36 calculates the estimated inherent strain value so that the difference between the deformation amount (estimated deformation amount) of the fabrication object M calculated backward from the estimated inherent strain value and the analytical deformation amount becomes a predetermined value or less. According to the present disclosure, the inherent strain can be predicted with high accuracy.

The strain calculation unit 36 calculates the estimated inherent strain value so that the total value of the first term $X_1$ based on the difference between the deformation amount (estimated deformation amount) of the fabrication object M calculated backward from the estimated inherent strain value and the analytical deformation amount and the second term $X_2$ based on the difference between the estimated inherent strain value and the predetermined inherent strain value is minimized. According to the present disclosure, the deviation of the deformation in the analysis from the actual one can be suppressed and the inherent strain can be predicted with high accuracy.

The arithmetic device 10 further includes the correction shape setting unit that corrects the target shape MA, based on the estimated inherent strain value. By correcting the target shape MA on the basis of the estimated inherent strain value, the shape can be corrected to be the target shape considering the deformation and the manufacture in the desired shape becomes possible.

The embodiments of the present disclosure have been described above, but other possible embodiments are not limited by the contents of the above-described embodiments. The components described above include those that can be easily conceived by persons who are skilled in the art, those that are substantially the same, and those that are in the so-called range of equivalence. Moreover, the aforementioned components can be combined as appropriate. Additionally, the components can be variously omitted, replaced, or changed without departing from the spirit and scope of the present disclosure.

REFERENCE SIGNS LIST

10 Arithmetic device
30 Target shape setting unit
32 Deformation amount acquisition unit
34 Analysis unit
36 Strain calculation unit
M Fabrication object
MA Target shape

The invention claimed is:

1. An arithmetic device comprising:
processing circuitry configured to
   acquire an actual measurement deformation amount of a fabrication object that is manufactured based on a target shape, the actual measurement deformation amount corresponding to a deviation amount of a shape of the fabrication object from the target shape;
   perform an analysis, based on the target shape of the fabrication object and a reference inherent strain value corresponding to a reference value of an inherent strain of the fabrication object, and acquires an analytical deformation amount corresponding to a deviation amount of the shape of the fabrication object in the analysis from the target shape; and
   calculate an estimated inherent strain value corresponding to an estimated value of the inherent strain of the fabrication object with the target shape, based on the actual measurement deformation amount and the analytical deformation amount, wherein
   the fabrication object is fabricated by layer stacking,
   the processing circuitry is further configured to
      set the inherent strain value for each layer, based on the reference inherent strain value, and
      analyze a model of the fabrication on which a first layer is stacked using the inherent strain value set for the first layer, and then analyzes a model of the fabrication in which a second layer is stacked on top of the first layer using the inherent strain value set for the second layer.

2. The arithmetic device according to claim 1, wherein the processing circuitry is configured to use the reference inherent strain value as the inherent strain to calculate, as the analytical deformation amount, the deviation amount of the shape from the target shape of a model of the fabrication object to have the target shape.

3. The arithmetic device according to claim 1, wherein the processing circuitry is further configured to calculates the estimated inherent strain value regarding a layer of the fabrication object, based on a difference between the analytical deformation amount when the layer is stacked and the analytical deformation amount when another layer is stacked in the analysis.

4. The arithmetic device according to claim 1, wherein the processing circuitry is further configured to calculates a correspondence between the deformation amount and the inherent strain of the fabrication object, based on the analytical deformation amount and the reference inherent strain value, and calculates the estimated inherent strain value, based on the actual measurement deformation amount and the correspondence.

5. The arithmetic device according to claim 1, wherein the processing circuitry is further configured to calculates the estimated inherent strain value so that a difference between the deformation amount of the fabrication object calculated backward from the estimated inherent strain value and the analytical deformation amount becomes a predetermined value or less.

6. The arithmetic device according to claim 5, wherein the processing circuitry is further configured to calculates the estimated inherent strain value so that a total value of a first term based on the difference between the deformation amount of the fabrication object calculated backward from the estimated inherent strain value and the analytical deformation amount and a second term based on a difference between the estimated inherent strain value and a predetermined inherent strain value is minimized.

7. The arithmetic device according to claim 1, wherein the processing circuitry is further configured to corrects the target shape, based on the estimated inherent strain value.

8. An arithmetic method comprising:
acquiring an actual measurement deformation amount of a fabrication object that is manufactured based on a target shape, the actual measurement deformation amount corresponding to a deviation amount of a shape of the fabrication object from the target shape;
performing an analysis, based on the target shape of the fabrication object and a reference inherent strain value corresponding to a reference value of an inherent strain of the fabrication object, to acquire an analytical deformation amount corresponding to a deviation amount of the shape of the fabrication object in the analysis from the target shape; and
calculating an estimated inherent strain value corresponding to an estimated value of the inherent strain of the fabrication object with the target shape, based on the actual measurement deformation amount and the analytical deformation amount, wherein
the fabrication object is fabricated by layer stacking,
the method further comprises:
  setting the inherent strain value for each layer, based on the reference inherent strain value, and
  analyzing a model of the fabrication on which a first layer is stacked using the inherent strain value set for the first layer, and then analyzing a model of the fabrication in which a second layer is stacked on top of the first layer using the inherent strain value set for the second layer.

9. A non-transitory computer-readable storage medium storing a computer program for causing a computer to execute:
acquiring an actual measurement deformation amount of a fabrication object that is manufactured based on a target shape, the actual measurement deformation amount corresponding to a deviation amount of a shape of the fabrication object from the target shape;
performing an analysis, based on the target shape of the fabrication object and a reference inherent strain value corresponding to a reference value of an inherent strain of the fabrication object, to acquire an analytical deformation amount corresponding to a deviation amount of the shape of the fabrication object in the analysis from the target shape; and
calculating an estimated inherent strain value corresponding to an estimated value of the inherent strain of the fabrication object with the target shape, based on the actual measurement deformation amount and the analytical deformation amount, wherein
the fabrication object is fabricated by layer stacking,
the computer program further causes the computer to execute:
  setting the inherent strain value for each layer, based on the reference inherent strain value, and
  analyzing a model of the fabrication on which a first layer is stacked using the inherent strain value set for the first layer, and then analyzing a model of the fabrication in which a second layer is stacked on top of the first layer using the inherent strain value set for the second layer.

\* \* \* \* \*